United States Patent
Kitaguchi (10) Patent No.: US 9,563,225 B2
(45) Date of Patent: Feb. 7, 2017

(54) PEDAL BRACKET FOR VEHICLE

(71) Applicant: Kazuaki Kitaguchi, Toyota (JP)

(72) Inventor: Kazuaki Kitaguchi, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 0 days.

(21) Appl. No.: 14/409,733

(22) PCT Filed: Mar. 5, 2013

(86) PCT No.: PCT/JP2013/056035
§ 371 (c)(1),
(2) Date: Dec. 19, 2014

(87) PCT Pub. No.: WO2013/190868
PCT Pub. Date: Dec. 27, 2013

(65) Prior Publication Data
US 2015/0198965 A1 Jul. 16, 2015

(30) Foreign Application Priority Data
Jun. 22, 2012 (JP) ................... 2012-141450

(51) Int. Cl.
*B60R 19/34* (2006.01)
*G05G 25/02* (2006.01)
(Continued)

(52) U.S. Cl.
CPC .............. *G05G 25/02* (2013.01); *B60T 7/06* (2013.01); *B62D 25/24* (2013.01); *G05G 1/44* (2013.01)

(58) Field of Classification Search
CPC ............. B60T 7/06; B62D 25/24; B60R 19/34
(Continued)

(56) References Cited

U.S. PATENT DOCUMENTS 5,983,746 A * 11/1999 Nawata .................. B60R 21/09
180/274
5,996,439 A * 12/1999 Elton ..................... B60T 7/065
180/255
(Continued)

FOREIGN PATENT DOCUMENTS

GB 2 366 608 A 3/2002
JP U-2-117959 9/1990

OTHER PUBLICATIONS

International Search Report issued in International Application No. PCT/JP2013/056035 mailed May 21, 2013.
(Continued)

*Primary Examiner* — Glenn Dayoan
*Assistant Examiner* — Sunsurraye Westbrook
(74) *Attorney, Agent, or Firm* — Oliff PLC (57) ABSTRACT

A vehicle pedal bracket includes a plate-like base plate portion fixed to a vehicle cabin side of a dash panel that separates an engine room and a vehicle cabin from each other, a support portion that is fixedly fitted to the base plate portion and by which a pedal arm is pivotably supported, and a plurality of tubular spacers fixedly fitted to the base plate portion, the vehicle pedal bracket is fixed to the dash panel with a plurality of screw members respectively inserted through the plurality of spacers, a plurality of tubular holding portions is disposed so as to project from a back side of the base plate portion, the back side is on the dash panel side, and so as to be in close contact with outer peripheral faces of the plurality of spacers, and a sound absorbing structural portion having a large number of bottomed holes.

4 Claims, 8 Drawing Sheets (51) Int. Cl.
*B60T 7/06* (2006.01)
*B62D 25/24* (2006.01)
*G05G 1/44* (2008.04)

(58) Field of Classification Search
USPC .............. 293/133; 296/187.09, 1.03; 74/512
See application file for complete search history.

(56) References Cited

U.S. PATENT DOCUMENTS

| | | | |
|---|---|---|---|
| 7,926,383 B2* | 4/2011 | Choi | B60R 21/09 74/512 |
| 2010/0147101 A1* | 6/2010 | Yamazaki | B60R 21/09 74/512 |
| 2013/0186230 A1* | 7/2013 | Fujiwara | B60R 21/09 74/560 |
| 2014/0109399 A1* | 4/2014 | Merlin | B60T 7/065 29/700 |
| 2014/0284127 A1* | 9/2014 | Matsuyama | B60K 26/02 180/89.1 |

OTHER PUBLICATIONS

Dec. 4, 2015 Office Action issued in Chinese Patent Application No. 201380032961.4.

* cited by examiner

PEDAL BRACKET FOR VEHICLE

TECHNICAL FIELD

The invention relates generally to a vehicle pedal bracket, and more specifically to a technique for reducing engine room noise that enters a vehicle cabin through an attached portion of the vehicle pedal bracket, in a simple way.

BACKGROUND ART

There is a known vehicle pedal bracket including: (a) a plate-like base plate portion fixed to the vehicle cabin side of a dash panel that separates an engine room and a vehicle cabin from each other; (b) a support portion that is fixedly fitted to the base plate portion and by which a pedal arm is pivotably supported; and (c) a plurality of tubular spacers fixedly fitted to the base plate portion so as to project from the base plate portion toward the dash panel to fix the base plate portion such that the base plate portion is separated from the dash panel, wherein (d) the vehicle pedal bracket is fixed to the dash panel with a plurality of screw members respectively inserted through the plurality of spacers. An example of such a vehicle pedal bracket is a device described in Patent Document 1. In this device, a cover portion of a box-like bracket in which spacers are disposed and which is filled with an insulator (sound absorbing material) formed by heat foaming functions as a base plate portion.

RELATED ART DOCUMENT

Patent Document

Patent Document 1: Japanese Utility Model Application Publication No. 2-117959

SUMMARY OF THE INVENTION

Problems to be Solved by the Invention

However, in such a conventional vehicle pedal bracket, a box-like bracket having a bottom portion and a cover portion connected to each other and filled with an insulator formed by heat foaming is required. This increases the number of components and the number of working man-hours, thereby increasing the manufacturing cost. Further, because a sound absorbing material is formed by heat foaming, application to a pedal bracket made of synthetic resin has been difficult.

The invention is made in the light of the above-described circumstances, and an object of the invention is to reduce engine room noise that enters a vehicle cabin through an attached portion of a vehicle pedal bracket having a base plate portion made of synthetic resin, in a simple way, without increasing the number of components and the number of working man-hours.

Means for Solving the Problems

To achieve the object, the first aspect of the invention provides a vehicle pedal bracket including: (a) a plate-like base plate portion fixed to a vehicle cabin side of a dash panel that separates an engine room and a vehicle cabin from each other; (b) a support portion that is fixedly fitted to the base plate portion and by which a pedal arm is pivotably supported; and (c) a plurality of tubular spacers fixedly fitted to the base plate portion so as to project from the base plate portion toward the dash panel to fix the base plate portion such that the base plate portion is separated from the dash panel, (d) the vehicle pedal bracket being fixed to the dash panel with a plurality of screw members respectively inserted through the plurality of spacers, characterized in that (e) a plurality of tubular holding portions are disposed so as to project from a back side of the base plate portion, the back side being on the dash panel side, and so as to be in close contact with outer peripheral faces of the plurality of spacers, and a sound absorbing structural portion having a large number of bottomed holes is formed at portions of the back side of the base plate portion, the portions facing the dash panel and being other than the holding portions, and (f) the holding portions and the base plate portion having the sound absorbing structural portion are formed integrally with each other from a synthetic resin material.

The second aspect of the invention provides the vehicle pedal bracket recited in the first aspect of the invention, wherein reinforcement ribs are formed integrally with the back side of the base plate portion to couple the plurality of holding portions to each other.

The third aspect of the invention provides the vehicle pedal bracket recited in the first or second aspect of the invention, wherein the base plate portion is formed as a single-piece member from a synthetic resin material containing a foaming agent; and a foam layer is formed inside the base plate portion by expansion molding.

Effects of the Invention

In the vehicle pedal bracket as described above, since a plurality of tubular holding portions are disposed so as to project from a back side of the base plate portion, and so as to be in close contact with outer peripheral faces of the plurality of spacers, and a sound absorbing structural portion having a large number of bottomed holes is formed at portions of the back side of the base plate portion, the portions facing the dash panel and being other than the holding portions, the engine room noise that enters the vehicle cabin through an attached portion of the pedal bracket is reduced appropriately. That is, although the engine room noise is transmitted toward the vehicle cabin mainly through the screw members and the spacers, the spacers are in close contact with the holding portions made of synthetic resin. Therefore, the noise and the vibrations are appropriately absorbed by the holding portions. Because the screw members are also in contact with the spacers, noise and vibrations, which transmit through the screw members, are also absorbed appropriately by the holding portions through the spacers. Moreover, noise and vibrations, which transmit through a space outside the holding portions, enter the large number of bottomed holes of the sound absorbing structural portion, are repeatedly reflected, and are thus attenuated.

Meanwhile, the holding portions and the base plate portion having the sound absorbing structural portion are formed integrally with each other from a synthetic resin material. Thus, the vehicle pedal bracket is formed at low cost without increasing the number of component and the number of working man-hours.

In the second aspect of the invention, reinforcement ribs are formed to couple the plurality of holding portions to each other. Thus, the spacers are held by the holding portions more firmly. As a result, it is possible to achieve weight reduction by reducing the thickness of each of the spacers, while maintaining a prescribed strength.

In the third aspect of the invention, the base plate portion is formed as a single-piece member from a synthetic resin material containing a foaming agent; and a foam layer is formed inside the base plate portion by expansion molding. Thus, due to the synergy between formation of the foam layer in the base plate portion and formation of the sound absorbing structural portion having the large number of bottomed holes, the noise from the engine room is reduced more effectively.

MODES FOR CARRYING OUT THE INVENTION

The invention is preferably applied to a vehicle pedal bracket directly fixed to a dash panel through a hole formed in an insulator in order to transmit pedal operating force through an operating rod or the like, for example, to a pedal bracket for a brake pedal, or a brake-accelerator integrated pedal. However, the invention may be applied to a vehicle pedal bracket attached to a dash panel with an insulator interposed between the dash panel and vehicle pedal bracket.

The paired support portions by which the pedal arm is pivotably supported are disposed, for example, on the respective sides of the pedal arm, and may be formed integrally with the base plate portion from a synthetic resin material. However, the support portions may be made of, for example, metal and formed separately from the base plate portion, and may be fixedly fitted to the base plate portion by insert molding, a melting and caulking process, or other fixing means. The support portions may be fixed by using spacers. When the base plate portion is fixed to the dash panel with screw members, the support portions may be fixedly fitted to the base plate portion with the screw members. However, the support portions are preferably fixed to the base plate portion in advance in terms of assembly workability.

The spacers are made of a high-strength material such as metal, and are fixedly fitted to the holding portions by insert molding or press-fitting. The spacers may be members having a simple tubular shape such as a cylindrical shape. However, each of the spacers may have an outward flange formed at its one end portion, and may be fixed such that the flange is in close contact with a front side (surface on the opposite side of the base plate portion from the dash panel) of the base plate portion. The screw members inserted through the spacers are, for example, stud bolts provided on a brake booster disposed on the engine room side. Nuts are screwed to distal end portions of the stud bolts, which pass through the spacers and project into the vehicle cabin, and are fastened so as to be brought into contact with the end portions of the spacers, whereby the base plate portion is fixedly fitted to the dash panel via the spacers. The bolts may be inserted into the spacers from the vehicle cabin side, and screwed to nut members disposed on the engine room side, whereby the base plate portion is fixed to the dash panel. Preferably, the spacers are cylindrical. However, the spacers may have a polygonal tubular shape, or may have a tapered shape so that the diameter is gradually changed. The holding portions disposed so as to be in close contact with the outer peripheral faces of the spacers may take various forms, like the spacers. Preferably, the holding portions are brought into close contact with entire circumferences of the outer peripheral faces of the spacers. However, the effect of absorbing noise and vibrations is obtained even when only each holding portion is brought into close contact with part of the outer peripheral face.

Each of the bottomed holes of the sound absorbing structural portion may be a circular hole having a constant diameter. However, each of the bottomed holes may be a tapered hole having a diameter that becomes smaller toward a bottom portion thereof, or may be a polygonal hole having a polygonal section, or a recess having, for example, a hemispherical shape with a relatively small depth. These bottomed holes are formed, for example, perpendicularly to the dash panel. Preferably, the bottomed holes are formed regularly at equal intervals in the up-down and right-left directions. However, the bottomed holes may be formed randomly.

As a synthetic resin material that forms the base plate portion, a synthetic resin material such as thermoplastic resin containing a foaming agent is preferably used, and, preferably, a foam layer is formed inside the base plate portion by expansion molding by using core back. However, the base plate portion may be made of a synthetic resin material that does not contain a foaming agent. The holding portions are formed integrally with the base plate portion. However, it is not appropriate that the foam layer be formed in the holding portions by expansion molding. Preferably, the expansion molding is performed only on a plate-like portion, which excludes the holding portions, to thereby form the foam layer. That is, a mold for the back side of the base plate portion is split into a mold for molding the holding portions and a mold for molding the plate-like portion excluding the holding portions, and only the mold for molding the plate-like portion is subjected to core back to perform expansion molding.

An insertion hole through which an output member such as an operating rod is inserted is formed in the base plate portion, and a plurality of (for example, four) spacers and a plurality of (for example, four) holding portions are disposed around the insertion hole. The invention is also applicable to a case where an insertion hole, through which an output member is inserted, is not formed in the base plate portion and the output member is disposed at a position apart from the vehicle pedal bracket.

In the second invention, reinforcement ribs are disposed on the back side of the base plate portion. However, when the other inventions are implemented, it is not necessary to dispose the reinforcement ribs and the reinforcement ribs may be disposed as needed. When the reinforcement ribs are disposed, preferably, the sound absorbing structural portion having a large number of the bottomed holes, and the foam layer are provided in a portion other than the holding portions and the reinforcement ribs.

EMBODIMENTS

Hereinafter, embodiments of the invention will be described in detail with reference to the accompanying drawings.

Figure 1:
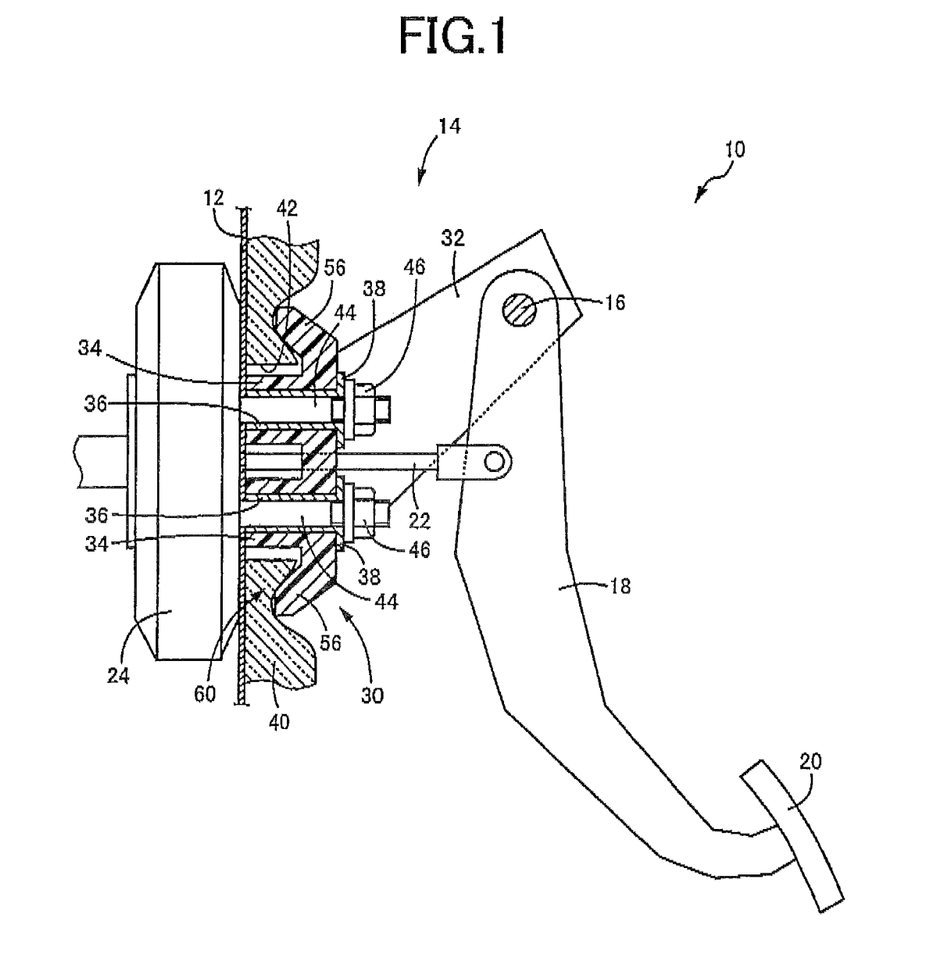
FIG. 1 is a view illustrating an example of a vehicle brake pedal apparatus for a service brake having a vehicle pedal bracket that is an embodiment of the present invention, and is a side view where a part of the vehicle brake pedal apparatus is cut away.

FIG. 1 is a view illustrating an example of a case where the invention is applied to a vehicle brake pedal apparatus 10 for a service brake, and is a side view where a part of the vehicle brake pedal apparatus 10 is cut away. The vehicle brake pedal apparatus 10 includes: a vehicle pedal bracket 14 disposed on a vehicle cabin side of a dash panel 12 that separates an engine room and a vehicle cabin from each other; and a pedal arm 18 that is supported by the vehicle pedal bracket 14 so as to be pivotable about the axis of a generally horizontal support shaft 16. When a pedal sheet 20 disposed at a lower end portion of the pedal arm 18 is depressed by a driver, an operating rod 22 coupled to an intermediate position of the pedal arm 18 via a clevis is pushed toward the front of a vehicle (leftward in FIG. 1), boosting is performed by a brake booster 24 disposed on the engine room side of the dash panel 12, and brake hydraulic pressure for the service brake is generated.

The vehicle pedal bracket 14 includes: a plate-like base plate portion 30 fixedly fitted to the dash panel 12; and a pair of support portions 32 disposed respectively on the right and left sides of a surface on the front side of the base plate portion 30, that is, a surface on the side that faces a driver's seat. The pedal arm 18 is disposed so as to be pivotable about the support shaft 16 disposed across the pair of support portions 32. A plurality of cylindrical holding portions 34 are disposed so as to project perpendicularly from a surface on the back side of the base plate portion 30, that is, a surface on the side that faces the dash panel 12, toward the dash panel 12. Further, cylindrical spacers 36 made of metal are fixedly fitted respectively in the holding portions 34 by press-fitting or insert molding. Outer peripheral faces of the spacers 36 are brought into close contact with inner peripheral faces of the holding portions 34 over substantially the entire circumferences. In the present embodiment, the base plate portion 30, the pair of support portions 32 and the plurality of holding portions 34 are formed integrally with each other from thermoplastic resin.

Each of the spacers 36 has an outward flange 38 at its one axial end portion. Each spacer 36 is disposed such that the flange 38 is in close contact with the front side of the base plate portion 30, whereby an other end portion thereof is substantially flush with a distal end face of the holding portion 34 and is brought into direct contact with the dash panel 12 together with the distal end face of the holding portion 34. That is, an insulator 40 having flexibility, such as felt, is attached to the vehicle cabin side of the dash panel 12 for noise reduction, an attachment hole 42 is formed at a portion of the insulator 40, to which the vehicle pedal bracket 14 is fixed, and the holding portions 34 and the spacers 36 are brought into direct contact with the dash panel 12. A stud bolt 44 held perpendicularly relative to the brake booster 24 is inserted through a corresponding one of the spacers 36 from the dash panel 12 side, and a nut 46 is screwed to a distal end portion of the stud bolt 44, which projects into the vehicle cabin, and is fastened so as to contact the flange 38. Thus, the vehicle pedal bracket 14 is fixed to the dash panel 12 with a prescribed attachment strength in a state where the base plate portion 30 is spaced apart from the dash panel 12. The stud bolt 44 corresponds to a screw member.

Figure 2:
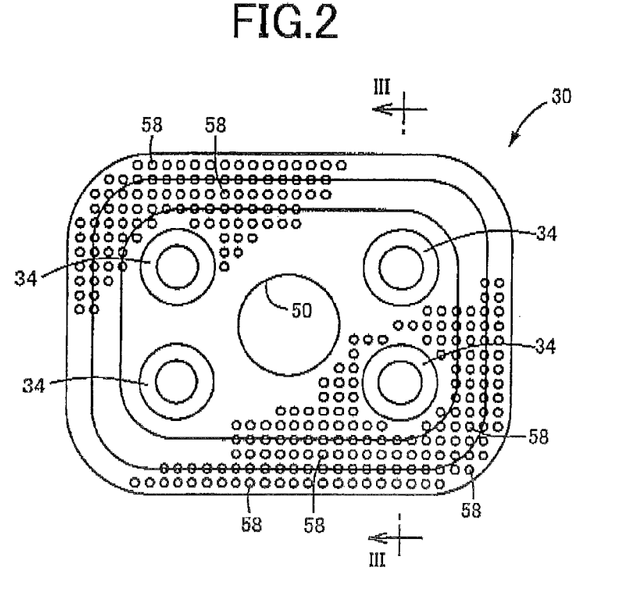
FIG. 2 is a back view of the base plate portion of the vehicle pedal bracket in FIG. 1, as viewed from the back side thereof.
Figure 3:
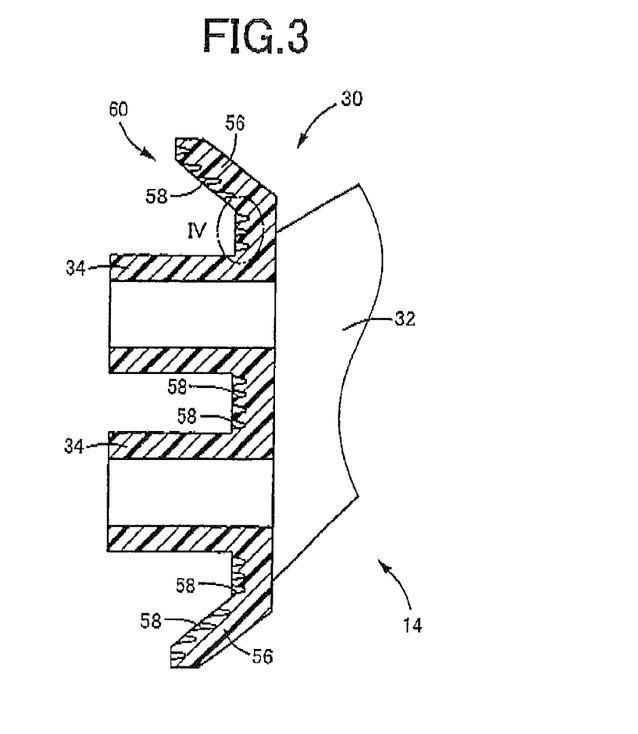
FIG. 3 is a sectional view taken along the line III-III in FIG. 2.
Figure 5:
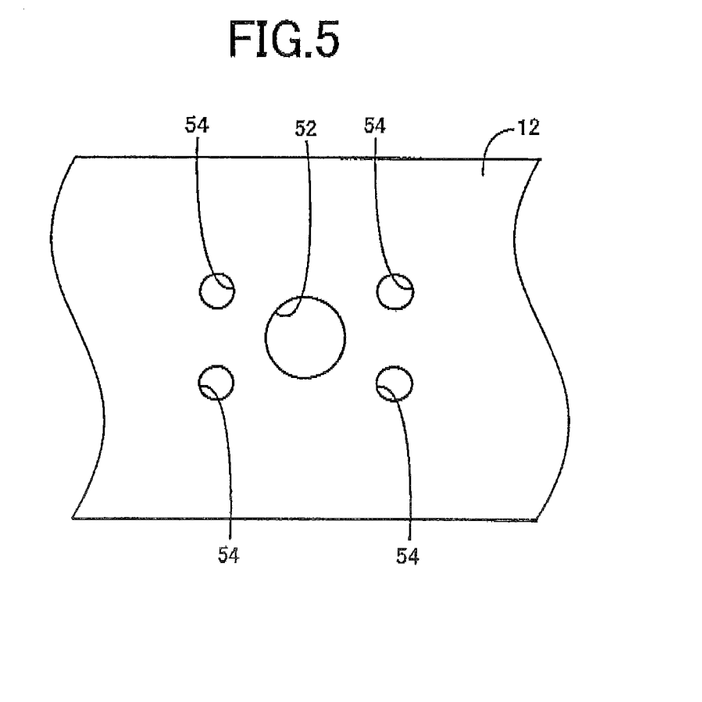
FIG. 5 is a front view of an attachment area of a dash panel, onto which the vehicle pedal bracket of FIG. 1 is attached.
Figure 6:
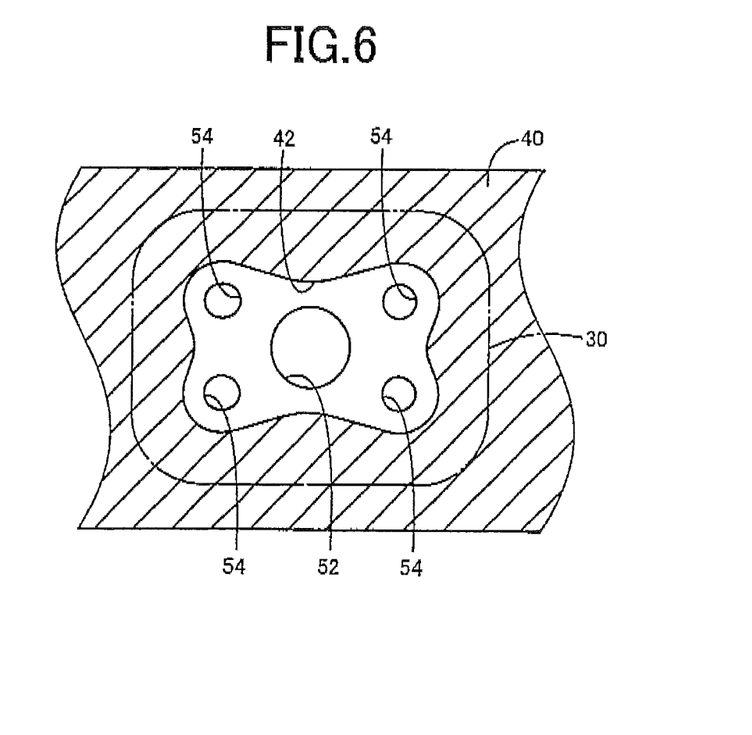
FIG. 6 is a front view illustrating a state where the insulator is attached to the dash panel in FIG. 5.

FIG. 2 is a back view of the base plate portion 30 of the above-described vehicle pedal bracket 14, as viewed from the back side thereof. FIG. 3 is a sectional view taken along the line III-III in FIG. 2. In FIG. 2 and FIG. 3, the spacers 36 are omitted. As is apparent from FIG. 2, the base plate portion 30 has a generally rectangular shape, and an insertion hole 50 through which the operating rod 22 is inserted is formed at the center portion of the base plate portion 30. Four holding portions 34 are disposed around the insertion hole 50 in a projecting manner, and four stud bolts 44 are disposed so as to correspond to the holding portions 34. FIG. 5 is a front view of an attachment area of the dash panel 12, onto which the vehicle pedal bracket 14 is attached, as viewed from the inside of the vehicle cabin. In the dash panel 12, an insertion hole 52 through which the operating rod 22 is inserted is formed, and in addition, four insertion holes 54 through which the stud bolts 44 are inserted are formed around the insertion hole 52. FIG. 6 is a front view illustrating a state where the insulator 40 is attached to the dash panel 12, in which a hatched portion is the insulator 40. An alternate long and short dash line in FIG. 6 indicates the outline of the base plate portion 30, and the attachment hole 42 is formed in the base plate portion 30. A peripheral edge portion of the attachment hole 42 is positioned by being pressed between a pressing portion 56, which is formed at an outer peripheral portion of the base plate portion 30, and the dash panel 12, and the peripheral edge portion of the attachment hole 42 of the insulator 40 is closed, so that leakage of noise to the inside of the vehicle cabin is suppressed. The pressing portion 56 is a portion formed over the entire circumference of the outer peripheral portion of the base plate portion 30 and tilted toward the dash panel 12, and makes positioning as a distal end portion (outer peripheral edge) thereof is engaged with the insulator 40 as illustrated in FIG. 1.

As illustrated in FIG. 2 and FIG. 3, a large number of bottomed holes 58 are also formed on the back side of the base plate portion 30, at portions that face the dash panel 12 and that are other than the holding portions 34. Each of the bottomed holes 58 including those formed in the tilted pressing portion 56 is formed so as to be perpendicular to the dash panel 12. Further, as is apparent from FIG. 4 that is an enlarged view of a portion IV in FIG. 3, each bottomed hole 58 is a tapered hole of which the diameter becomes smaller toward its bottom portion. A diameter d of an opening of each of the bottomed holes 58 is a value within a range from approximately two to seven mm. A surface layer portion of the back side of the base plate portion 30, on which the large number of bottomed holes 58 are formed, functions as a sound absorbing structural portion 60 that attenuates noise and vibrations of the engine room as the noise and vibrations reflect on inner peripheral faces of the bottomed holes 58 many times. Note that the bottomed holes 58 are omitted in FIG. 1.

In the vehicle pedal bracket 14 as described above, the attachment hole 42 is formed in the insulator 40, and the spacers 36 and the holding portions 34 are brought into direct contact with the dash panel 12, and thus the vehicle pedal bracket 14 is attached to the dash panel 12 with a high attachment strength. However, a sound insulation function by the insulator 40 is not obtained inside the attachment hole 42 and the spacers 36 made of metal are brought into direct contact with the dash panel 12, and thus the engine room noise is easily transmitted to the inside of the vehicle cabin.

In contrast to this, in the vehicle pedal bracket 14 according to the present embodiment, the cylindrical holding portions 34 are disposed so as to project from the back side of the base plate portion 30 and so as to be in close contact with the outer peripheral faces of the spacers 36. In addition, the sound absorbing structural portion 60 having the large number of bottomed holes 58 is formed at the portions that face the dash panel 12 and that are other than the holding portions 34. Thus, the engine room noise that enters the vehicle cabin through an attached portion of the pedal bracket 14 is reduced appropriately. That is, although the engine room noise is transmitted toward the vehicle cabin mainly through the stud bolts 44 and the spacers 36, the spacers 36 are in close contact with the holding portions 34 made of synthetic resin. Therefore, the noise and the vibrations are appropriately absorbed by the holding portions 34. Because the stud bolts 44 are also in contact with the spacers 36, noise and vibrations, which transmit through the stud bolts 44, are also absorbed appropriately by the holding portions 34 through the spacers 36. Moreover, noise and vibrations, which transmit through a space outside the holding portions 34, enter the large number of bottomed holes 58 of the sound absorbing structural portion 60, are repeatedly reflected, and are thus attenuated.

In particular, in the present embodiment, the outer peripheral portion of the base plate portion 30 reaches the outer peripheral side of the attachment hole 42 of the insulator 40, and in addition, the pressing portion 56 is disposed at the outer peripheral portion of the base plate portion 30 and the peripheral edge portion of the attachment hole 42 of the insulator 40 is closed by being pressed between the pressing portion 56 and the dash panel 12. Thus, leakage of noise to the inside of the vehicle cabin is suppressed, and a higher sound insulation effect is obtained.

Meanwhile, in the vehicle pedal bracket 14 according to the present embodiment, the holding portions 34 and the base plate portion 30 having the sound absorbing structural portion 60 are formed integrally with each other from a synthetic resin material. Thus, the vehicle pedal bracket 14 is formed at low cost without increasing the number of component and the number of working man-hours.

Next, other embodiments of the invention will be described. Note that, in the following embodiments, like reference numerals denote elements substantially the same as those in the foregoing embodiment to omit the detailed description thereof.

Figure 7:
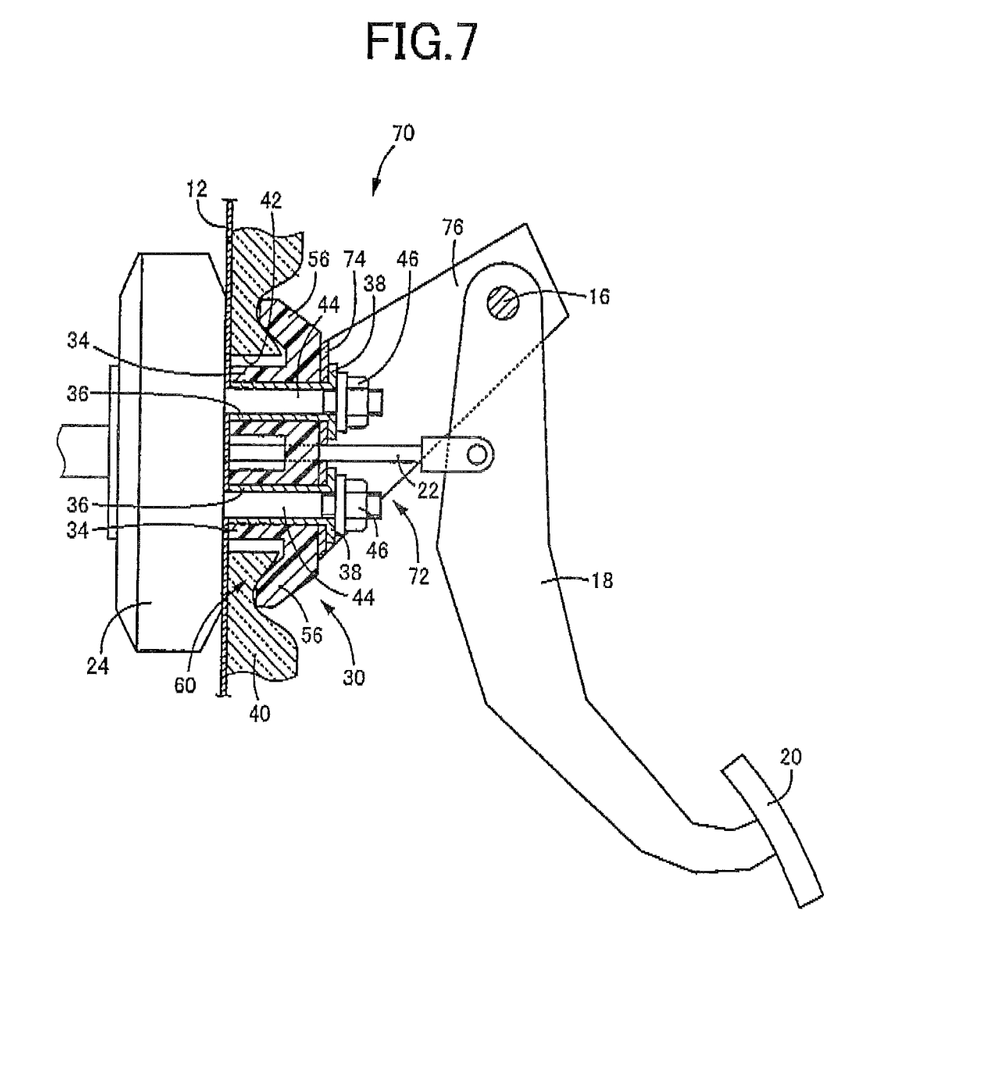
FIG. 7 is a view illustrating another embodiment of the present invention, and is a side view corresponding to FIG. 1 where a part of the vehicle brake pedal apparatus is cut away.

A vehicle pedal bracket 70 in FIG. 7 has a support member 72 made of metal, formed to have a U-shaped section (angular U-shaped section), and formed separately from the base plate portion 30. For example, when the spacers 36 are fixedly press-fitted into the holding portions 34, a back portion 74 of the support member 72 is pressed against the base plate portion 30 by the flanges 38 of the spacers 36, so that the vehicle pedal bracket 70 is fixedly fitted to the base plate portion 30. Alternatively, the support member 72 and the spacers 36 may be fixedly fitted to the base plate portion 30 by insert molding. In the support member 72, a pair of sidewalls 76 on the respective sides of the back portion 74, which are parallel to each other, function as support portions, the support shaft 16 is disposed across the sidewalls 76, and the pedal arm 18 is pivotably supported.

Figure 4:
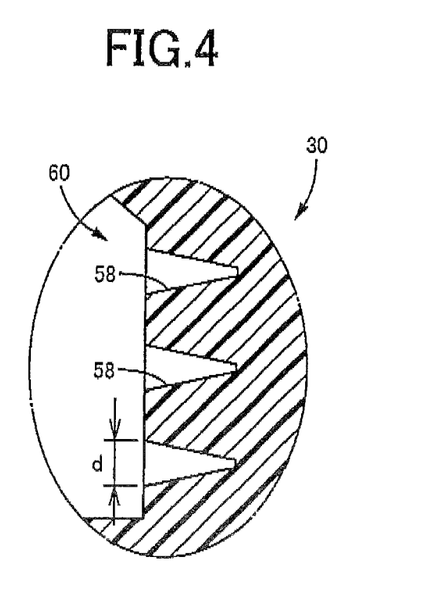
FIG. 4 is an enlarged view of a portion IV in FIG. 3.
Figure 8:
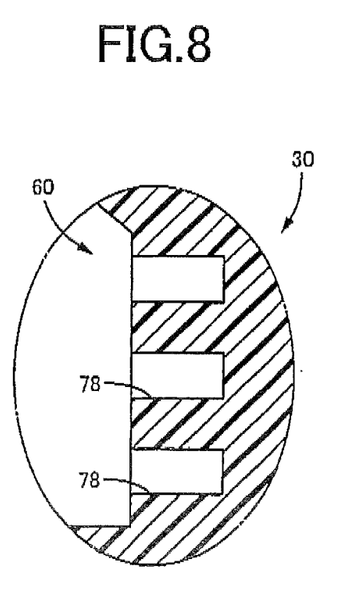
FIG. 8 is a view illustrating yet another embodiment of the present invention, and is an enlarged sectional view of a sound absorbing structural portion.

FIG. 8 is a view illustrating another example of the sound absorbing structural portion 60, and is a sectional view corresponding to FIG. 4. In the sound absorbing structural portion 60, a large number of bottomed holes 78 are cylindrical holes each having a constant diameter, and the diameter of each of the bottomed holes 78 is set equal to the diameter d.

Figure 9:
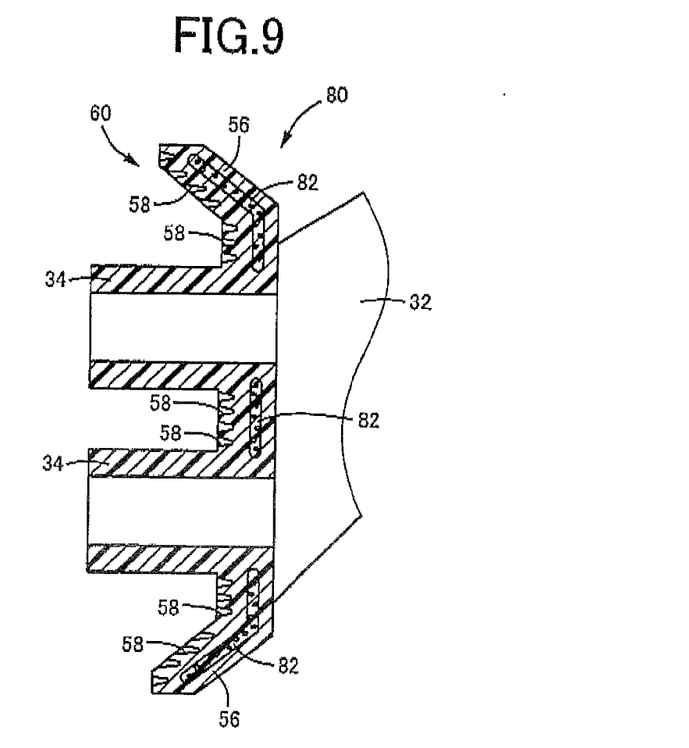
FIG. 9 is a view illustrating yet another embodiment of the present invention, and is a sectional view corresponding to FIG. 3.
Figure 10:
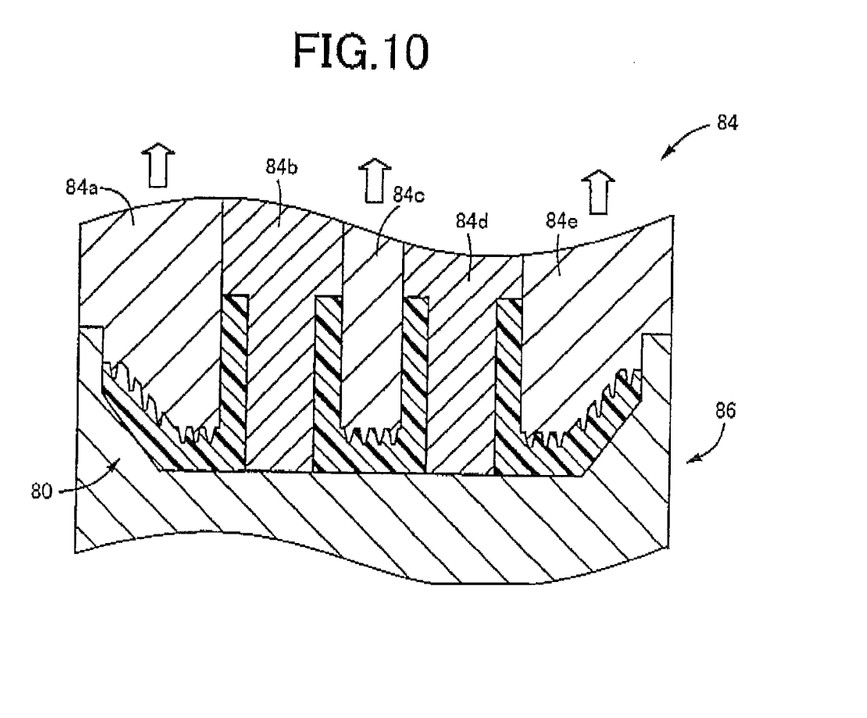
FIG. 10 is a sectional view for explaining expansion molding when a foam layer of the embodiment in FIG. 9 is formed.

FIG. 9 is a sectional view corresponding to FIG. 3 described above, and illustrates a case where a foam layer 82 is formed inside a base plate portion 80. That is, the base plate portion 80 is formed as a single-piece member from thermoplastic resin containing a foaming agent. After the base plate portion 80 is molded by a pair of molds 84, 86 as illustrated in FIG. 10 and before the base plate portion 80 is completely cooled and cured, portions 84a, 84c, 84e of the mold 84 on the back side of the base plate portion 80 are retracted (core back) by a prescribed distance. Thus, a plate-like portion except the holding portions 34, that is, a portion in which the sound absorbing structural portion 60 is subjected to expansion molding, and the foam layer 82 is formed inside the sound absorbing structural portion 60 by foaming of the foaming agent. In the mold 84, portions 84b, 84d, which are used to mold the holding portions 34, and the portions 84a, 84c, 84e, which are used to mold the plate-like portion other than the holding portions 34, are formed separately from each other.

Due to the synergy between formation of the foam layer 82 in the base plate portion 80 and formation of the sound absorbing structural portion 60 having the large number of bottomed holes 58, the noise from the engine room is reduced more effectively.

Figure 11:
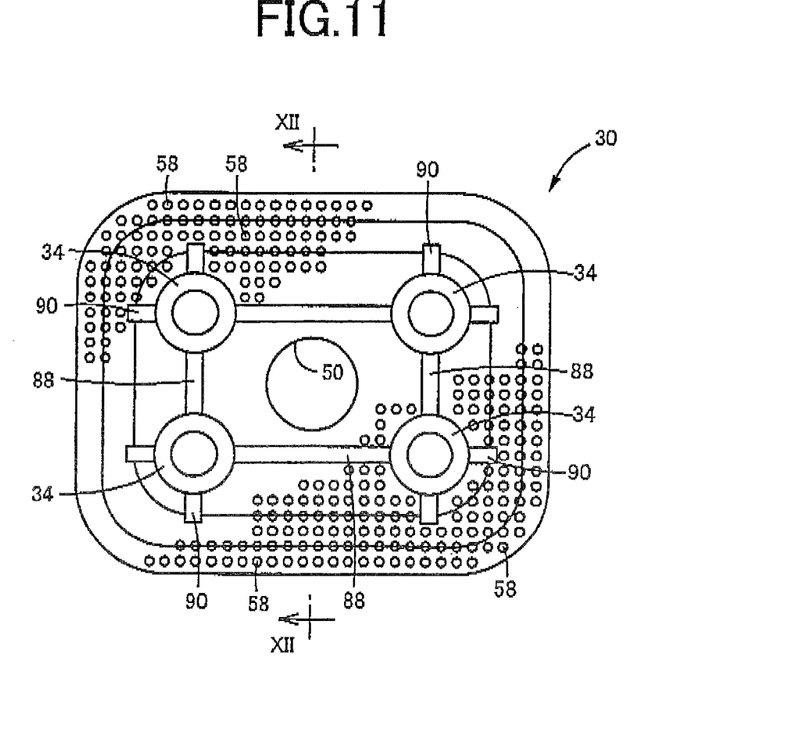
FIG. 11 is a view illustrating yet another embodiment of the present invention, and is a back view of the base plate portion corresponding to FIG. 2.
Figure 12:
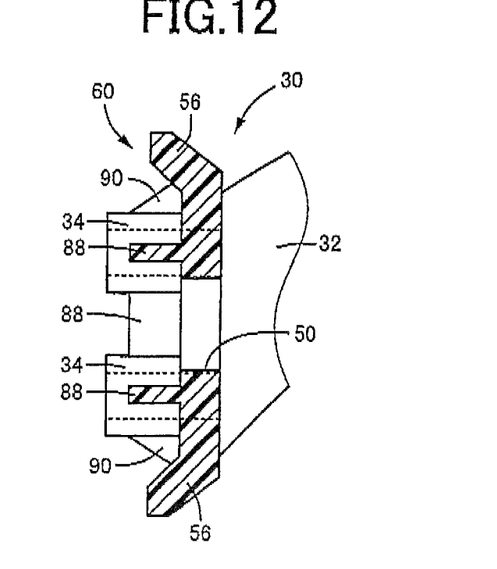
FIG. 12 is a sectional view taken along the line XII-XII in FIG. 11.

FIG. 11 is a view corresponding to FIG. 2, and is a back view of the base plate portion 30. FIG. 12 is a sectional view taken along the line XII-XII in FIG. 11. On the back side of the base plate portion 30, a plurality of reinforcement ribs 88 are disposed so as to couple the plurality of holding portions 34 to each other, and triangular reinforcement ribs 90 are disposed on extensions of the reinforcement ribs 88 at positions between the holding portions 34 and the pressing portion 56. The reinforcement ribs 88, 90 are disposed as described above, whereby the spacers 36 are held by the holding portions 34 more firmly. As a result, it is possible to achieve weight reduction by reducing the thickness of each of the spacers 36, while maintaining a prescribed strength. Note that, the bottomed holes 58 are omitted in FIG. 12.

While example embodiments of the invention have been described in detail with reference to the drawings, each of the example embodiments is merely one mode for carrying out the invention. The invention may be implemented in various modes achieved by making various changes and improvements based on the knowledge of a person skilled in the art.

NOMENCLATURE OF ELEMENTS

12: dash panel 14, 70: vehicle pedal bracket 18: pedal arm 30, 80: base plate portion 32: support portion 34: holding portion 36: spacer 44: stud bolt (screw member) 58, 78:

bottomed hole 60: sound absorbing structural portion 76: sidewall (support portion) 82: foam layer 88: reinforcement rib

The invention claimed is:

1. A vehicle pedal bracket including:
   a plate-like base plate portion fixed to a vehicle cabin side of a dash panel that separates an engine room and a vehicle cabin from each other;
   a support portion that is fixedly fitted to the base plate portion and by which a pedal arm is pivotably supported; and
   a plurality of tubular spacers fixedly fitted to the base plate portion so as to project from the base plate portion toward the dash panel to fix the base plate portion such that the base plate portion is separated from the dash panel,
   the vehicle pedal bracket being fixed to the dash panel with a plurality of screw members respectively inserted through the plurality of spacers,
   a plurality of tubular holding portions being disposed so as to project from a back side of the base plate portion, the back side being on the dash panel side, and so as to be in close contact with outer peripheral faces of the plurality of spacers, and a sound absorbing structural portion having a large number of bottomed holes being formed at portions of the back side of the base plate portion, the portions facing the dash panel and being other than the holding portions,
   the holding portions and the base plate portion having the sound absorbing structural portion being formed integrally with each other from a synthetic resin material, and
   reinforcement ribs being formed integrally with the back side of the base plate portion to couple the plurality of holding portions to each other.

2. The vehicle pedal bracket according to claim 1,
   the base plate portion being formed as a single-piece member from a synthetic resin material containing a foaming agent; and
   a foam layer being formed inside the base plate portion by expansion molding.

3. The vehicle pedal bracket according to claim 1,
   each of the plurality of spacers having an outward flange at one axial end portion of each of the plurality of spacers,
   each of the plurality of spacers being disposed such that the flange is in direct or indirect contact with a surface on an opposite side of the base plate portion from the dash panel, and
   an other end portion of each of the plurality of spacers being substantially flush with a distal end face of the holding portion and being direct contact with the dash panel together with the distal end face of the holding portion.

4. The vehicle pedal bracket according to claim 2,
   each of the plurality of spacers having an outward flange at one axial end portion of each of the plurality of spacers,
   each of the plurality of spacers being disposed such that the flange is in direct or indirect contact with a surface on an opposite side of the base plate portion from the dash panel, and
   an other end portion of each of the plurality of spacers being substantially flush with a distal end face of the holding portion and being direct contact with the dash panel together with the distal end face of the holding portion.

* * * * *